United States Patent [19]

Dempsey et al.

[11] Patent Number: 4,853,536
[45] Date of Patent: Aug. 1, 1989

[54] IONIZATION CHAMBER FOR MONITORING RADIOACTIVE GAS

[75] Inventors: John C. Dempsey, Salamanca; Payasada Kotrappa, Olean, both of N.Y.

[73] Assignee: Rad Elec Inc., Frederick, Md.

[21] Appl. No.: 936,240

[22] Filed: Dec. 1, 1986

[51] Int. Cl.⁴ .................................. G01T 1/02
[52] U.S. Cl. .................... 250/253; 250/255; 250/336.1
[58] Field of Search ............ 250/336.1, 253, 255

[56] References Cited

U.S. PATENT DOCUMENTS

| | | | |
|---|---|---|---|
| 2,695,363 | 11/1954 | Marvin | 250/374 |
| 4,064,436 | 12/1977 | Ward, III | 250/253 |
| 4,338,523 | 7/1982 | Alter | 250/472.1 |
| 4,385,236 | 5/1983 | Hassib et al. | 250/472.1 |
| 4,401,891 | 8/1983 | Lewiner et al. | 250/374 |
| 4,451,736 | 5/1984 | Cameron | 250/376 |
| 4,518,860 | 5/1985 | Alter et al. | 250/253 |

FOREIGN PATENT DOCUMENTS 237721  7/1986  German Democratic Rep. .................. 250/253

OTHER PUBLICATIONS

Gupta et al, "Electret Personnel Dosemeter", Radiation Protection Dosimetry, 11 (2), pp. 107–112, 1985.
Kotrappa et al, "Measurement of Potential Alpha Energy Concentration of Radon and Thoron Daughters using an Electret Dosemeter", Radiation Protection Dosimetry, 5 (1), 1983, pp. 49–56.
Kotrappa et al, "An Electret Passive Environmental ²²²Rn Monitor Based on Ionization Measurement", Health Physics, 54 (1), Jan. 1988, pp. 47–56.

*Primary Examiner*—Carolyn E. Fields
*Attorney, Agent, or Firm*—Cushman, Darby & Cushman

[57] ABSTRACT

A small enclosed chamber with an electrostatically charged electret attached to the inner chamber wall. A filtered hole in the chamber permits radon or other radioactive gas to enter by diffusion. Positive or negative ions (depending on the polarity of the electret charge) formed in the chamber air by the decay of the radioactive gas move to and collect on the electret surface by virtue of its electrostatic attraction to ions of opposite polarity. These ions accumulate and cause a measurable reduction in the surface voltage of the electret which reduction is proportional to the time integrated concentration of the radioactive gas in the chamber. The electret surface voltage of the reduction value is used to calculate the average concentration of the radioactive gas during the exposure period. The electret thickness and chamber volume can both be increased to increase the sensitivity of the invention to radioactive gases such as radon, tritium or carbon-14 dioxide or such other radioactive gases.

37 Claims, 4 Drawing Sheets

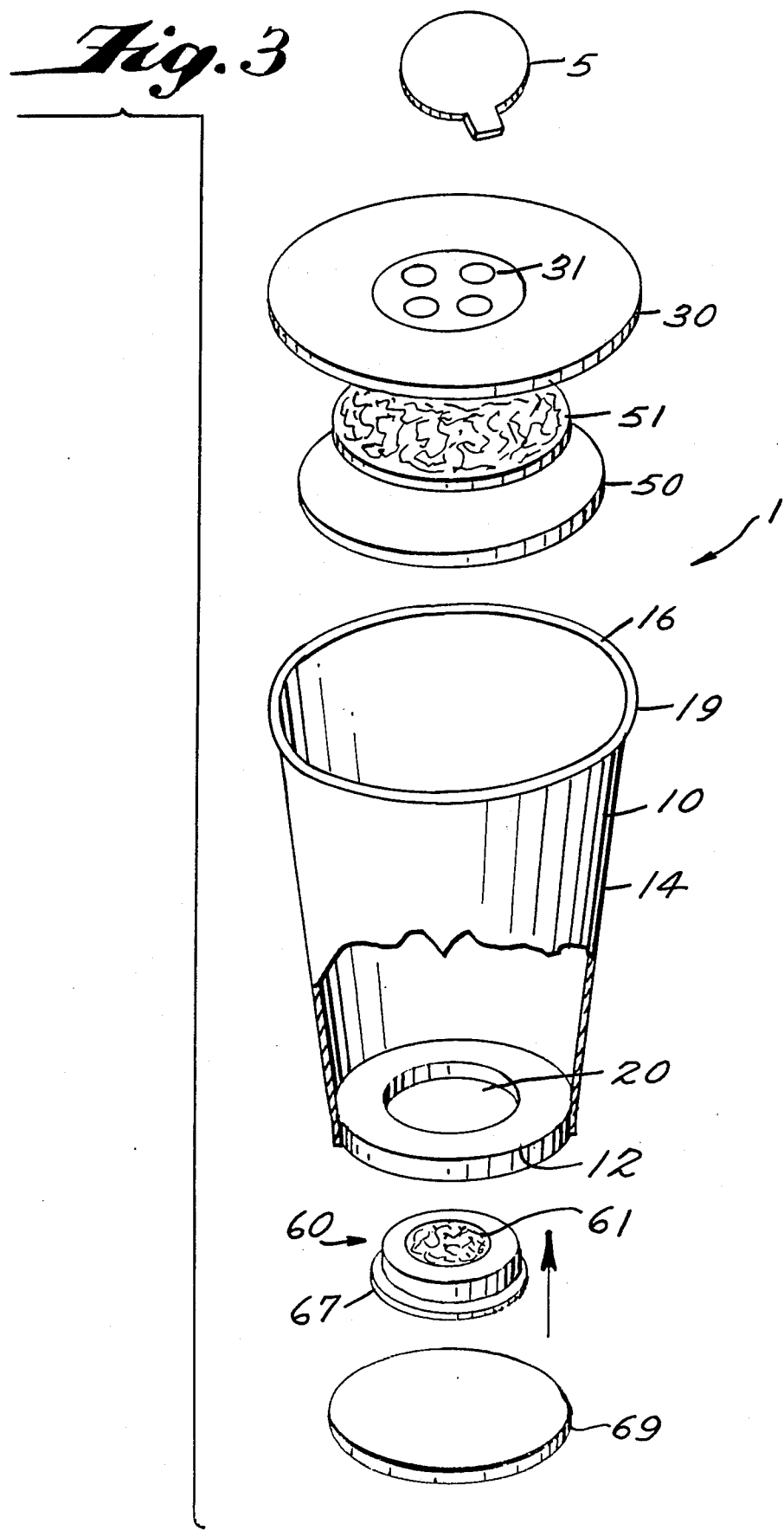

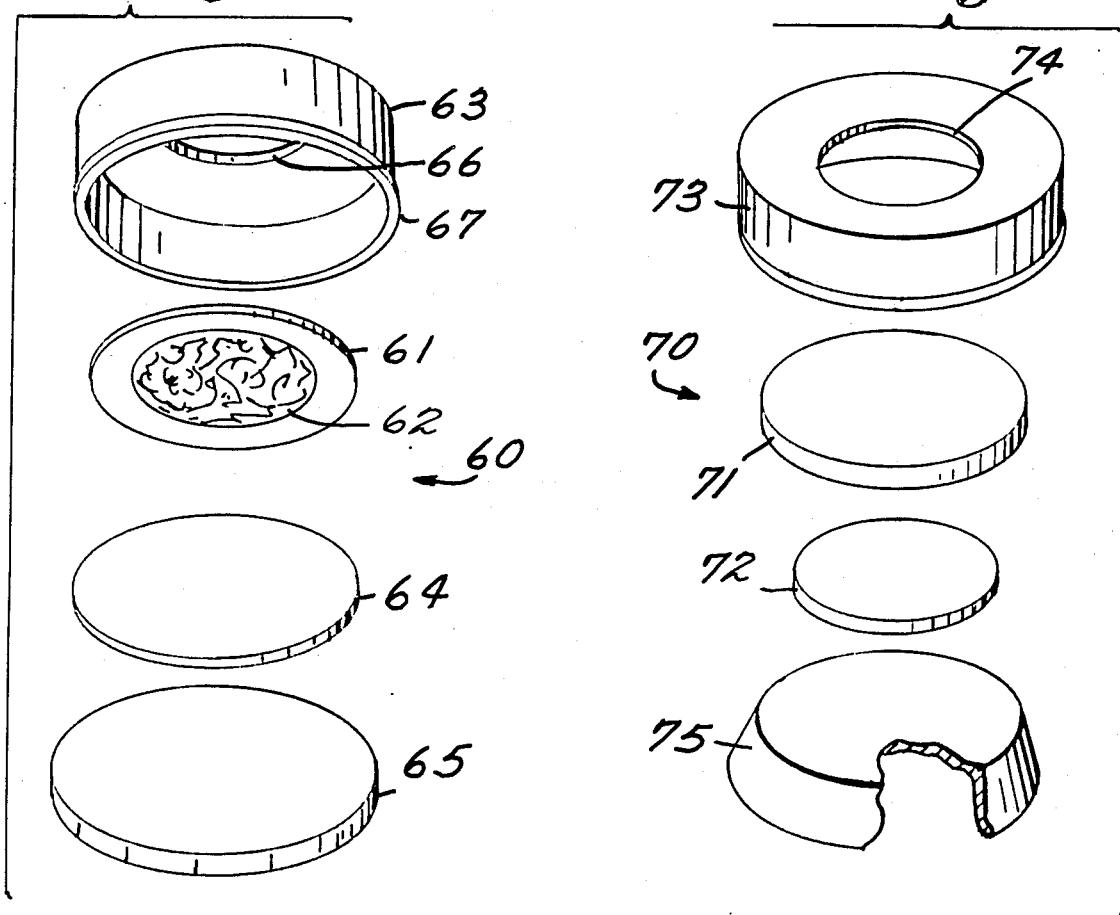

IONIZATION CHAMBER FOR MONITORING RADIOACTIVE GAS

BACKGROUND OF THE INVENTION

This present invention provides simple, effective and accurate cumulative measurement of radioactive gas over a time period.

Measurements of radioactive gas are important for many purposes. Tritium concentrations in potentially exposed workers are measured, for example, with periodic urine specimens. Carbon-14 serves as a useful research tool for monitoring the progress of many chemical and biological reactions and interactions. For example, many microorganisms break down carbon-14 containing compounds in sugar to produce carbon-14 dioxide gas which can be collected and measured to determine various characteristics of the microorganisms. Both tritium and carbon-14 dioxide produce low energy radiation which cannot be easily measured by conventional radioactivity detectors.

Radon (Rn-222) and thoron (Rn-220) are radioactive gases which are formed in the uranium and thorium decay series. They decay by alpha emissions with a half-life of 3.8 days and 55.4 seconds respectively. When they are formed near the surface of uranium containing materials such as soil or rock, they can diffuse out into the surrounding air where they and their daughter products can pose a radiological hazard to man under certain conditions. Each time a radon (Rn-222) atom decays, its daughter products, Polonium-218 (Po-218), lead-214 (Pb-214), bismuth-214 (Bi-214), polonium-214 (Po-214), decay in sequence with half lives of 3.05 minutes, 26.8 minutes, 19.7 minutes, 0.16 milliseconds, respectively. The Po-218 and Po-214 are more hazardous than their radon gas parent because they emit very energetic alpha particles and they are particulates and can deposit in lungs when breathed. Once in the lungs, their high energy alpha emissions can damage tissue and may cause cancer. Thoron decays in a similar manner, is harmful to a lesser degree.

Radon and associated daughter products have long been known to be a causative agent for lung cancer when present in high concentrations usually found in uranium mines. More recently, concern has been expressed by many scientists over the high radon concentrations that have been measured in poorly ventilated homes all across the country. Hazardous radon concentrations often build up in homes, especially in "tightly" constructed energy-efficient homes and in those which have been retrofit sealed to conserve energy. The U.S. Environmental Protection Agency has estimated that 5,000–20,000 lung cancer deaths will occur annually in the United States as a consequence of this radon buildup in homes. The resulting concern over this hazard has given rise to a need for a low cost, passive instrument for measuring the concentrations of these natural radioactive gases. Similar health hazards are associated with breathing other radioactive gases such as tritium or carbon-14 dioxide in and around nuclear facilities. Therefore, a need exists for small compact rugged devices which are capable of accurately and dependably measuring radiological gases and integrating the measurements over known times.

Integrating-type monitors which measure the average concentrations of radon or other radioactive gases over a few days, weeks or months are especially useful because wide short-term fluctuations in concentration often occur due to perturbations in ventilation and atmospheric conditions. The present invention meets all of these needs. When used as a radon and/or thoron monitor, it is simple, small and rugged enough to be mailed to homeowners and back to the laboratory for readout. This eliminates the cost of technicians travelling to and from the homes to perform the monitoring. A miniature version can be worn to monitor workers for radon, thoron or tritium exposure. In another embodiment, it serves to monitor the very small quantities of tritium and carbon-14 dioxide emitted from biologically active cultures in certain measurements and experiments.

Several scientists have described various types of passive environmental radon monitor (PERMS) in recent years. However, only a few of them; e.g., A.C. George (Ref 1: A Passive Environmental Radon Monitor; Radon Workshop—Feb. 1977, HASL-325; 1977 p. 25) and C. Costa-Riberio, et al. (Ref. 2: A radon Detector Suitable for Personnel or Area Monitoring, Health Physics Vol, 17, 1969), utilized a thin metal plate maintained at a high negative voltage to collect the positively charged decay products of radon to gain increased measurement efficiency and accuracy. This enhanced accuracy is especially needed for the home monitoring application where radon concentrations are normally low. All of these workers took advantage of the fact that the radon daughter products are positively charged when formed. The alpha radiation emitted by the daughter products is measured either by thermoluminescent dosimeters or by alpha track detectors and the results are used to calculate the radon concentration.

Collection plates and the measuring detectors in these earlier devices were located inside filtered passive diffusion chambers which prevented the radon daughter products already present in the outside air from reaching the detector. Only the parent radon gas can pass through the filter by passive diffusion to enter the measuring chamber. In these earlier devices, the radon gas which diffused into the chamber was indirectly monitored by measuring the radiation from the daughter products which are formed inside the chamber after they were collected on the surface of the Collectors. They did not measure the parent radon gas directly. Radioactive gases such as C-14 dioxide and tritium do not form charged particulate daughter products. Therefore, the earlier inventions cited will not measure these gases. The present invention, however, will measure any radioactive gas because their radioactive emissions always generate ions in the chamber air. Further, the present invention uses electret as a sensor which is different from the detectors used by earlier devices.

Kotrappa et al. (Ref. 3: Electret—A New Tool for Measuring Concentrations of Radon and Thoron in Air) also experimented with electrets for indirect monitoring of radon or thoron. They used negatively charged electret as a collector in the place of metal sheet maintained at a high negative voltage. They also measured alpha radiation of collected daughter products by scintillation detectors or by other known detectors. In addition, they made an incidental measurement of charge on the polycarbonate sheet covered electret as a requirement of the experiments to ensure sufficient charge on the polycarbonate sheet to collect the daughter products. The difference in surface charge of polycarbonate sheet before and after the experiment was not used for measurement of radon. However, they found a rather poor correlation between the difference in charge on polycarbonate sheet (electret itself was not measured) to the cumulative radon exposure and suggested further work.

There are two reasons why that earlier device gave a very poor correlation with radon exposure as follows: (1) The polycarbonate foil used by Kotrappa, et al. had a much higher electrical conductivity than the electret material which was fluorocarbon polymer. This conductivity caused the ions which collected on the polycarbonate foil to bleed off to ground much more readily than they do from the electret. (2) The adhesive tape and the air gap between the polycarbonate foil and the electret caused by the adhesive tape in the Kotrappa device also perturbed the ion collection and retention capability of the electret assembly substantially.

All of these factors contributed to the very poor correlation between radon exposure and surface voltage in the Kotrappa device and rendered it unsuitable for radon monitoring.

In another paper, Kotrappa et al. (Reference 4: Measurement of Potential Alpha Energy Concentration of Radon and Thoron Daughters Using an Electret Dosimeter, Rad. Pro. Dos. Vol. 5, No. 1 of p. 49–56—1983) measured the voltage difference on an electret to quantify the amount of alpha energy expended in air by radon and thoron daughter products which were captured on a filter. The system did not measure radon gas.

The device developed by Kotrappa et al. in Ref. 4 also embodies a pump to transport the radon daughter products into the chamber.

A need exists for small compact rugged devices which are capable of accurately and dependably measuring radiological gases and integrating the measurements over known times.

H. B. Marvin (Reference 5: U.S. Pat. No. 2,695,363; Method and Apparatus for Measuring Ionizing Radiations, issued Nov. 23, 1954) used an electret to collect and store ions. The chamber in this earlier invention was sealed to prevent air entry so it measured only the gamma radiation which penetrated through the chamber wall.

This correlation between electret voltage and radon exposure using the present invention (i.e., with no adhesive tape or polycarbonate film), is excellent and it serves as a very accurate radon monitor. FIG. 1 shows this correlation using the present invention with a 225 ml cup-shaped chamber and 90 ml thick electret made of FEP Teflon.

The present invention also differs from devices which used real-time detectors (i.e., devices connected to real-time electronic readout systems). The present invention uses, instead, an electret type detector which records and integrates the positive or negative ions generated by the radon and radon daughter radiations without the need for connections to electronic devices during the radon exposure period. Real-time electronic equipment is too expensive and unwieldy for large scale home monitoring use.

Some monitoring devices are too large and heavy for home use because of the high voltage batteries or power supply utilized to maintain the charge on the detectors. Instead of batteries, the present invention uses a small precharged electret as described above. The electret ion-collection approach enables an accurate monitoring device which is small and rugged enough to be sent to homeowners through the mail. The use of a simple electret itself as a sensor rather than a solid state detector reduces the cost of the monitor and its readout equipment substantially.

SUMMARY OF THE INVENTION

The present invention measures and integrates measurement of radioactive gases with compact rugged portable devices. The devices are suitable for use with measurements of any radioactive gas, for example, radon, tritium and carbon-14 dioxide. For convenience of understanding and compactness of disclosure, the devices will be described in use with radon.

The present invention makes use of the passive diffusion chamber principle, but it does not depend on collection of the daughter products, nor does it utilize other radiation detectors.

The present invention uses a charged electret surface to collect ions formed by the ionizing radiations (primarily alpha radiation) emitted by both the radon and radon daughters anywhere in the chamber. This collection and measurement of ions rather than daughter product atoms eliminates the cause of a substantial error found in the earlier radon monitors; viz., false low radon concentration readings in measurements taken in high relative humidity conditions. The present invention exhibits no such error such ion mobility is not affected by humidity.

The humidity error in the earlier daughter product Collection instruments was thought to be due to water molecules which, due to their polar properties, gather on some of the charged daughter product atoms soon after their formation. This added weight slowed down the rate of travel of the affected daughter product atoms giving them more time to be electrically neutralized by nearby negative ions. This neutralization stopped their Collection, causing them to decay in the chamber air rather than on the solid state detector surface. This caused the earlier monitors having solid state radiation detectors to give radon concentration values substantially below the actual value on humid days.

The present invention depends on the movement of ions rather than daughter products to the collecting surface. Such ions are smaller than the daughter product atoms, and their mobility is known to be unaffected by moisture.

Unlike the charged daughter product atoms, the smaller ions move quickly and efficiently to the electret from any point in the chamber even under high humidity, to yield a true radon concentration value.

This collection of ions rather than daughter products also gives the newly invented monitor more sensitivity for monitoring radon or thoron. This higher sensitivity is needed to measure the low radon concentration found in many homes. The added sensitivity in the present invention for radon measurement comes from the fact that it measures ionization from the parent radon-222 decay events which occur in the chamber, in addition to the daughter product decay radiations. The earlier solid state detection devices only measured the later (daughter product) events whereas the electret in the present invention collects ions formed by the parent radon-222 alpha particles as well as those formed by the two radon daughter products. Thus, one-third more decay events are measured by the present invention from the same radon concentrations. The previous monitor only collected and measured the daughter products, not the radon itself because radon atoms are not electrostatically charged, and therefore are not attracted to the charged detectors used in those devices. Any ions which are attracted to the charged detector in those earlier devices were not measured because the solid state radiation detectors used were not capable of measuring ions as does the electret in the present invention.

The preferred embodiment of the present invention teaches exposing and reading the voltage of the electret itself with no foil attached to it. The preferred embodiment of the present invention does not embody a polycarbonate foil on or above the electret. Instead, the electrostatic field emanating from the electret surface is measured directly.

This correlation between electret voltage and radon exposure using the present invention (i.e., with no adhesive tape or polycarbonate film), is excellent and it serves as a very accurate radon monitor. FIG. 1 shows this correlation using the present invention with a 225 ml cup-shaped chamber and 90 ml thick electret made of FEP Teflon.

The present invention also differs from devices which used real-time detectors (i.e., devices connected to real-time electronic readout systems). The present invention uses, instead, an electret type detector which records and integrates the positive or negative ions generated by the radon and radon daughter radiations without the need for connections to electronic devices using the radon exposure period. Real-time electronic equipment is too expensive and unwieldy for large scale home monitoring use.

Some monitoring devices are too large and heavy for home use because of the high voltage batteries or power supply utilized to maintain the charge on the detectors. The present invention does not use any battery or high voltage source but uses a small precharged electret as described above. The electret ion-collection approach enables an accurate monitoring device which is small and rugged enough to be sent to homeowners through the mail. The use of a simple electret as a sensor rather than a solid state detector reduces the cost of the monitor and its readout equipment substantially.

The present invention measures radon gas concentration in the environment, not radon daughter products because it embodies a filter which precludes daughter products from entering the measuring chamber. The present invention utilizes passive diffusion to transport the radon into the chamber.

The charged electrets used to collect and measure radon generated ionization in the invention can be of either positive or negative polarity. Depending on the polarity of the electret used, it functions in the invention in one of the following ways:

(1) Using a positively charged electret: When a positively charged electret is used as in the preferred embodiment of the invention, only the negative ions generated by the alpha emissions in the chamber collection on the surface of the electret. Here, the surface of the electret repels both the positive ions and the radon daughter products (which are all positively charged) causing them to move to and attach to the chamber wall where their electrostatic charge immediately discharges to the ground. The daughter products eventually decay on the chamber wall with 50% of them emitting their radiations (primarily alpha particles) back into the chamber air to ionize the air therein. The negative ions accumulate on the positive electret, causing its surface voltage to decrease. A measure of this electret voltage reduction again serves as the basis for calculating the desired radon concentration value, as described above.

(2) Using a negatively charged electret: When a negatively charged collector-electret is used, the positive ions which are formed by the radiations from the decay of radon and radon daughter product atoms move quickly to the negative electret by virtue of the electrostatic potential field established in the chamber. In this embodiment, the negative air ions which are generated in the chamber air move to the chamber wall where they are discharged to ground.

As the positive ions buildup on the negative electret, they cause the electret surface voltage to decrease. A measurement of the difference in the electret surface voltage before and after the radon exposure can then be used to determine the desired radon concentration value using a predetermined calibration table. In this embodiment, the positively charged daughter products are also attracted to the electret. This phenomena is of little practical consequence when smaller chambers (i.e., up to about 1 liter) are used because the majority of the ions formed by their decay radiations get collected and measured regardless of where the radon decay events take place in the chamber. However, this daughter product collection increases the sensitivity of monitors having chamber volumes larger than one liter.

When larger chambers are used to gain more sensitivity, all or part of the inner chamber surfaces may also be lined with electret material charged in a polarity opposite to that of the electret to aid in moving the ions toward the electret to hasten their capture on its surface. This same electret lining of the chamber can also be used in the invention with an uncharged piece of electret material (fluorocarbon polymer) in place of the electret. In this embodiment, the uncharged polymer piece serves to collect and retain the ions which are repelled by the charged chamber surfaces because it is at a much lower voltage and, in effect, behaves as if it were charged in the opposite polarity. The charge from the radon emissions builds up with increased radon exposure in this embodiment.

The volume of the chamber can also be varied to increase or decrease the sensitivity and dynamic range of the invention for radon measurement within limits. The radon sensitivity of the invention is directly proportional to the chamber volume over a larger volume range. Chambers up to 5 liters in volume can be used for high sensitivity and down to 0.005 liters for low sensitivity within this proportional range. The sensitivity falls rapidly in chambers less than about 0.05 liters because more of the alpha particle energy is expended in the chamber walls rather than in ionizing air in the chamber. Accordingly, chambers of less than 0.05 liters are preferred in monitors which require low sensitivity, e.g., those exposed to high radon concentrations for long durations.

The electrets used in the present invention are, in the preferred embodiment, made of fluorocarbon polymer or some other suitable polymer having a high electrical resistivity which prevents the accumulated charge from "leaking" to ground. FEP or PTFE Teflon of 1 to 200 mils thickness are preferred materials for the purpose.

Within limits (up to about 500 mils), the thicker the electret, the larger its surface voltage becomes for equivalent electrostatic charge and the larger its voltage drop will be for equivalent radon exposure. Thus, the electret thickness is varied in practice to obtain an optimum voltage change depending on the number of ions expected to accumulate on the electret in a given radon monitoring situation.

Two electrets of different polarity (i.e., one positive and one negative) and different thickness can also be embodied in the same chamber to extend the dynamic range of the monitor. For example, a thick positive electret will give maximum voltage change for low radon concentrations and a thin, negative electret in the same chamber will record high concentrations beyond the range of the thick electret. Since one of the electrets in this embodiment collects only negative ions and the other collects only positive ions, they both function in the same chamber.

In other embodiment of the invention, an uncharged detector (electrically neutral) detector cap made of high dielectric electret material (usually fluorocarbon polymer) is fixed in a rigid holder above the electret, as shown in FIG. 3b. The detector cap may either be in direct contact with the electret or be held a short distance directly below it. In this embodiment, the detector cap is transparent to the electrostatic field emanating from the electret under it so the ions generated by radon decay in the chamber collect on the cap surface rather than on the electret itself. In this embodiment, the cap is removed from the electret and the increase in its surface voltage is measured (rather than the decrease in electret voltage) to determine the radon concentration value. The configuration shown in FIG. 3b permits the cap to be removed from the electret for measurement without altering the charge on it (the cap).

This electret detector cap is usually the same size and shape as the electret, i.e., if the electret is a 3 cm. diameter disc, the cap is also a 3 cm disc. Being made of the same material as the electret, this cap is initially transparent to the electric field from the electret under it. This is true regardless of the polarity of the electret charge. As mentioned above, the cap intercepts and collects the ions drawn toward the electret by virtue of its (the electret's) electrostatic field. These intercepted ions accumulate on the cap surface and are held there firmly by the electrostatic field of opposite polarity emanating from the permanently charged electret underlying it. The accumulated charge on the cap can be measured at any time by removing it (the cap) from the electret and measuring its (the cap's) surface voltage. The surface cap voltage of the detector cap increases with increased radon exposure as shown by the calibration curve shown in FIG. 2.

This capped electret assembly can be substituted directly for the uncapped one (as used in the preferred embodiment) in the ionization chamber of the present invention for monitoring radon.

This capped electret embodiment has advantages over the preferred embodiment for some applications. Most important, the charge on the electret is not diminished by use so it never has to be recharged. Its radon measuring accuracy is not affected by voltage instabilities in the underlying electret because the voltage of the cap, not that of the electret, is measured to determine the radon concentration. Also since the cap always has zero charge prior to radon exposure, there is no need to measure and record the surface voltage before use of the invention, i.e., a single voltage measurement after the radon exposure is all that is needed to make the radon concentration calculation.

Since the ions collect on the detector cap rather than on the electret itself in this capped electret embodiment, the surface voltage of the electret remains essentially constant throughout the exposure and measurement process. This results in a substantial cost advantage for the capped embodiment because there is no need to recharge the electret after each monitoring use. Instead, it is only necessary to place a new uncharged cap on the same electret to proceed with the next radon measurement. The caps can be discharged in various ways and re-used many times.

Kotrappa, et al. (see discussion of Reference 3 above) placed a cap on their electret in a manner similar to that taught in this embodiment, however, as pointed out in the above discussion on this reference, they used a cap made of polycarbonate rather than fluorocarbon polymer and they did not measure the surface voltage of the separated cap for monitoring the radioactive gas as taught here.

The preferred embodiment of the invention is a small (40–500 ml) chamber into which radon or other radioactive gas can readily enter by diffusion through a hole covered with a filter membrane material. The membrane materials and thickness is chosen so as to delay the transport of any thoron which may be present so it all decays away before it gets into the chamber. Thoron has a half life of only 55.6 sec. so this is rapidly accomplished by a latex rubber membrane 50 um thick. The average amount of thoron present can be monitored by subtracting the readings of two like devices which have been exposed for the same time period, one with and one without a thoron excluding membrane.

A positively charged electret is fixed to the inside surface of the chamber which electrostatically collects the negative ions (electrons) which are generated in the chamber by the decaying radon and radon daughter products. Each negative ion neutralizes a positive ion in the electret causing the surface voltage of the electret to drop. The invention has a simple adhesive tape sealing mechanism for opening and closing it to radon entry from the surrounding environment and a lid which can be opened to permit removal of the electret for measurement or replacement.

After the initial electret voltage is measured and the monitor is located in or on the home facility or person to be measured, the user removes the tape seal over the filtered hole in the chamber for a known, predetermined time so that the radioactive gas in the environment can enter. When the exposure time is over, the homeowner reseals the chamber hole with the mechanism provided and returns the whole device to the laboratory where the final electret voltage is measured. A commercial surface voltage measuring instrument is available which can measure these electret voltages to within 1 volt without disturbing the remaining charge on the electret. Thus, the electret can usually be remeasured or reused repeatedly without recharging. From the difference in the electret voltage readings before and after the radon exposure, the average concentration of radon which existed in the surrounding environment during the test period is calculated using a calibration curve.

BRIEF DESCRIPTION OF THE DRAWINGS

FIG. 3 is a sectional elevation of the preferred embodiment of an ionization chamber for monitoring radon constructed according to the present invention.

FIG. 3a is an exploded sectional elevation of the electret assembly in the preferred embodiment.

FIG. 3b is an exploded sectional elevation of an alternative capped electret assembly embodiment which can be substituted for the electret assembly shown in FIG. 3.

FIG. 3c is a view of an alternative embodiment showing a positively charged electrode fixed into the inside surface of the chamber.

DETAILED DESCRIPTION OF THE PREFERRED EMBODIMENT

Figure 1:
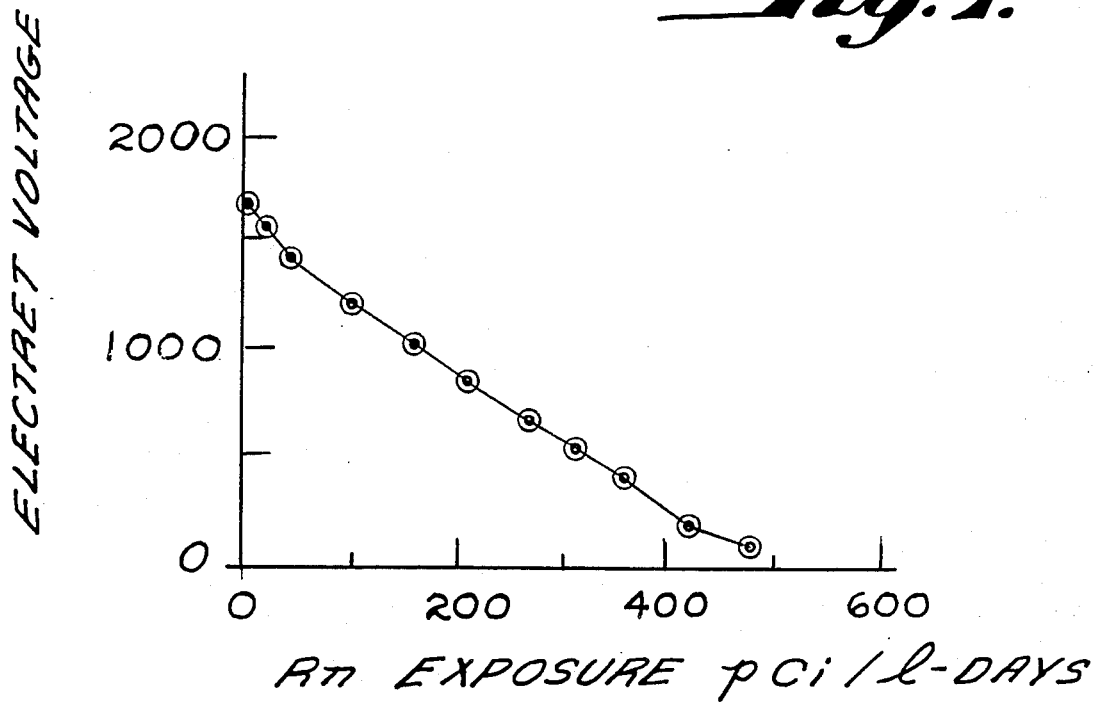
FIG. 1 is a plot of a calibration curve showing the response of the preferred environment of the invention to various amounts of radon.
Figure 2:
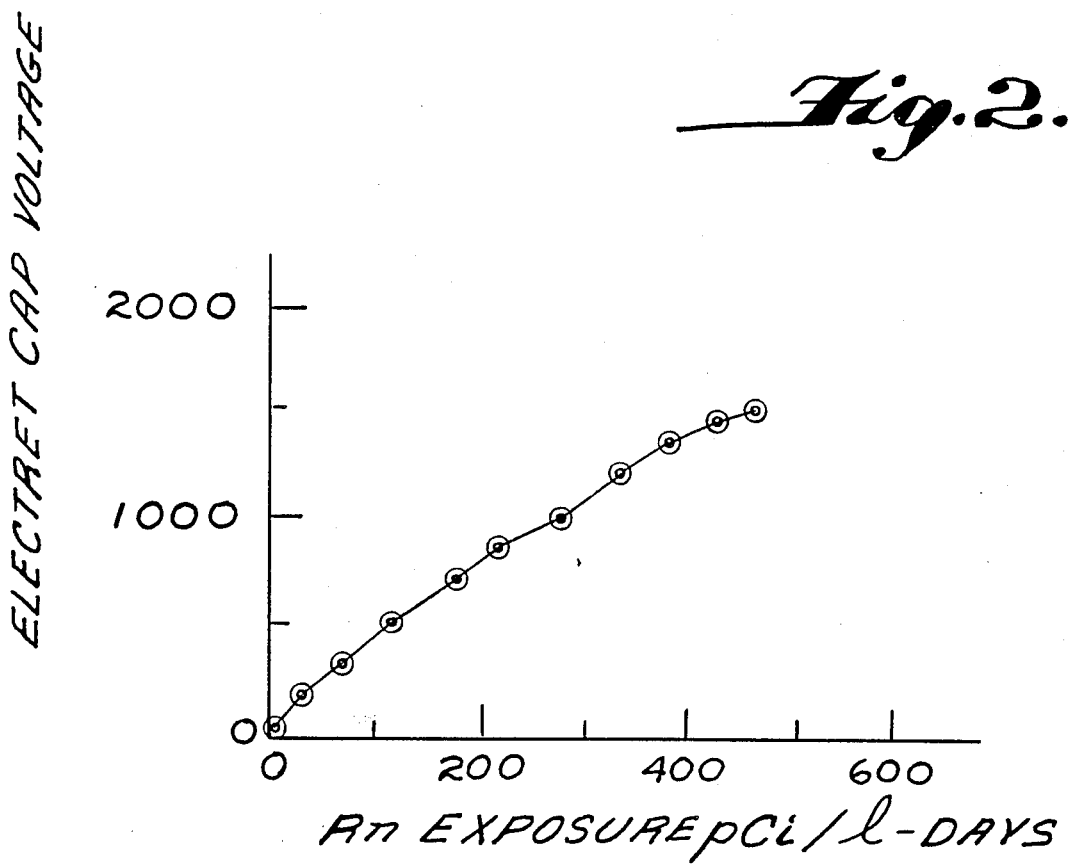
FIG. 2 is a plot of a calibration curve showing the response of the alternative embodiment of the invention to various amounts of radon.

FIGS. 1 and 2 were described earlier.

The basic components of the preferred embodiment of the ionization chamber for monitoring radioactive gases shown in FIG. 3 are the cup-shaped chamber 10, a porous, removable cover assembly 30 and a removable electret assembly 60 fixed to the bottom surface 12 of the chamber 10. The monitor includes a removable adhesive tape seal 5 which adheres to the top of the cover 30 to seal the monitor against radon entry before and after its exposure to the environment to be measured. Cup 10 has a circular disk-shaped bottom 12. A truncated cone-shaped side wall 14 extends upward from the periphery of the disk-shaped bottom 12 and terminates upwardly in a large, open, upper edge 16.

A rounded ledge 19 around the inner perimeter of the cop 14 slightly below the upper edge 16 serves as a seat and a seal for the cover 30. A friction fit or an appropriate adhesive or an adhesive tape around the edge 16 serves to hold the cover 30 on the ledge 19 when the monitor 1 is assembled.

The cover 30 contains a hole or group of holes 31 near its center to permit gases to enter. A filter 50 and a membrane 51 are fixed over the holes 31 on the bottom of the cover 30 with an appropriate adhesive bond. Filter 50 removes particles, ions and radon daughter products from the ambient gas that passes in and out of the chamber 10 through the holes 31 in the cover 30. The membrane 51 serves to exclude thoron gas from entering by delaying its diffusion until it all decays (is half life is only 56.6 sec.).

Holes 31 through the cover 30 permit radon to diffuse through the filter 50 and into the chamber 10 continuously while excluding all outside dust, ions and charged radon daughter atoms.

The charged electret 61 attracts and captures any ions of opposite polarity formed in the chamber 10 by the nuclear emissions of the decaying radon and radon daughter products. The chamber 10 can be made of any rigid material which is impermeable to radon, such as metal or plastic, but its inner surface must be electrically conductive to conduct away to ground any electrostatic charged caused by ions which attach to it during monitoring. The cover 30 can be made of any rigid material such as plastic or metal, but its inner surface must also be electrically conductive.

An electret assembly 60 is fixed in the center of the inside surface of the chamber bottom 12.

The top portion of the cylindrical electret assembly 60 fits tightly into hole 20 through the bottom 12 of chamber 10 but the bottom ring 67 will not pass through the hole 20 because it is larger in diameter than the hole 20. Accordingly, it seals against the chamber bottom 12. The electret assembly 60 is held in place by a cardboard disk 69 which is forced into the bottom of the chamber 10 so as to hold the assembly ring 67 firmly against the chamber bottom 12. The cardboard disk 69 can be removed to remove the assembly 60. Figure 3a is a sectional elevation of this electret assembly. The bottom of the electret 61 is covered with an electrically conductive metallic backing 62. This backing 62 is electrically connected to the surface of the electret protector cup 63 by a metal foil 64 held in place by the friction fitted retainer disk 65, which is usually made of cardboard.

The electret protector cup 63 has a hole 66 in its top which exposes the electret 61 and permits its electrostatic field to emanate into the chamber 10. The electret assembly 60 can be removed from the chamber 10 for measurement by mechanically breaking the adhesive bond between the retainer disk 65 and the chamber bottom 12.

The preferred shape of the electret 61, which is permanently electrostatically charged, is a disk, as shown.

FIG. 3b is a sectional elevation of an alternative electret and cap assemblies 70 which embodies a cap 71 held above or in contact with the electret 72 by a cap holder 73. The cap 71 is suspended across the hold 74 in the cap holder 73 by adhesive bonding attachment to the cap holder 73. The cap 71 is made of a fluorocarbon polymer having a high electrical resistivity so the ions which accumulate on its surface do not bleed off to ground. The electret 72 is bonded to the bottom of the electret holder 75 which fits inside of the cap holder 73 to bring the electret 72 into contact with the cap 71. The electret 72 and cap 71 can be held in contact by bonding applied between the electret holder 75 and the cap holder 73.

Figure 4:
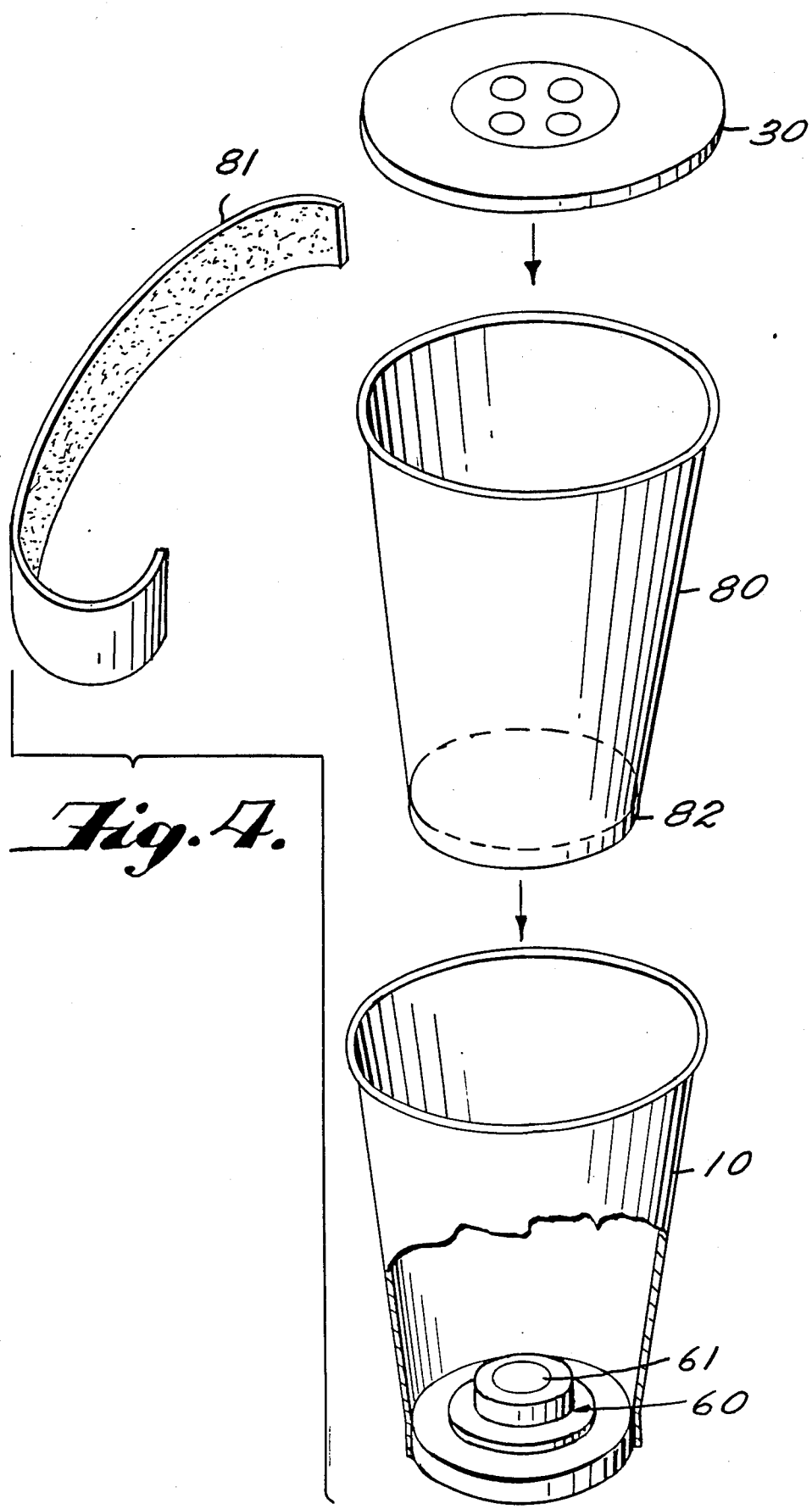
FIG. 4 is a sectional elevation of an alternate embodiment of an ionization chamber for monitoring radon constructed according to the present invention which has features which reduce the contribution of background gamma radiation to the radon signal.

FIG. 4 shows an optional cup-in-cup embodiment which can be used with either embodiment of the invention to improve their radon measuring accuracy. This inner chamber or cup 80 is of the same shape as the chamber 10 in the preferred embodiment shown in FIG. 3 and it fits inside of the chamber 10 in FIGS. 3 and 4. Either embodiment of the invention will function without this inner cup 80 but it serves to improve the accuracy of the radon measurement. Prior to storage and shipment, the inner cup 80 is slipped inside the radon monitoring chamber 10. The tight fitting cover 30 containing the filter 30 is then placed on the inner cup 80 and adhesive tape 81 is applied between the two components to hold them together and to prevent radon entry into the volume remaining in the false bottom 82 during storge and shipment. The entire inner surface of the false volume 82 is lined with a conductive material to prevent the electrostatic field from the electret 61 from entering inner cup 80.

It can be seen that the inner cup 80 purges the air and radon from the ionization chamber 10 as it is shoved into place inside the chamber 10. The inner cup 80 has a false bottom 82 which straddles the electret assembly 60 or 70 without touching it when the inner cup 80 is in place inside the chamber 10. With the radon and air thus substantially removed from the radon chamber 10, ions are prevented from forming and collecting on the electret 61 or electret cap 71 (depending on the embodiment used). Thus the inner cup 80 effectively stops the radon monitoring process in the invention when it is in place inside the chamber 10. The same inner cup 80 eliminates all unwanted ionization generated by the background gamma radiation which penetrates the chamber 10. This improves the accuracy of the invention because background radiation is known to vary from place to place.

FIG. 3c shows a positively charged electret 61' fixed to the inside surface of the chamber 10'. The positively charged electret 61' forms a second electret which lies in a spaced apart relation from the first electret 61. The second electret comprises substantially the inner surface of the chamber.

We claim:

1. A radioactive gas monitoring apparatus comprising a container, openings in the container for allowing gases to enter the container, a filter over the openings to exclude entry of radioactive progeny attached to particles, said container having an inner surface which is electrically conductive, an electret positioned within the container for holding an electrostatic charge which collects ions and other charged substances formed in the container by radioactive decay of the radioactive gases and their progeny, a removable means connected to the container for mounting the electret, and means for reducing the volume of gas exposed to the electret when the chamber is not in use.

2. The apparatus of claim 1 wherein the electret is negatively charged so that it collects positively charged ions and radon daughter products formed in the container.

3. The apparatus of claim 1 wherein the electret is positively charged so that it collects negative ions formed in the container.

4. The apparatus of claim 1 wherein said filter comprises means mounted on the container and covering the openings in the container for filtering aerosols and particles from gases entering the container through the openings.

5. The apparatus of claim 1 wherein the container comprises a generally circular bottom and a wall extending upward therefrom to a circular edge and wherein a cover overlies the circular edge and wherein the electret is mounted on an inside of either the cover or the bottom.

6. The apparatus of claim 5 further comprising a detector cap mounted close to and in the electric field of the electret.

7. The apparatus of claim 1 further comprising a purging cup means fitting within the container for purging gas from the container.

8. The apparatus of claim 1 further comprising a removable bottom on the container for holding the electret positioned within the container on the bottom and for removal with the electret for measuring charge change on the electret.

9. The apparatus of claim 1 wherein said filter comprises means for excluding radon progeny produced by the radioactive decay of radon.

10. A radioactive gas monitoring apparatus comprising a container with electrically conductive surfaces, openings in the container for allowing gases to enter the container, a filter over the openings to exclude entry of radon progeny attached to particles, a first electret positioned within the container for holding an electrostatic charge which collects the charged substances formed in the container by radiation from the radioactive gases and their progeny, a second electret positioned within the container spaced from the first electret, the second electret having an electrostatic charge which is opposite to an electrostatic charge of the first electret for repelling charged substances in the gas by the second electret toward the first electret.

11. The apparatus of claim 10 wherein the first electret is charged negatively and wherein the second electret is charged positively for driving negatively charged substances in the gas toward the first electret.

12. The apparatus of claim 11 wherein the negatively charged electret comprises means for collecting positively charged substances in the gas and the positively charged electret comprises means for collecting negatively charged substances in the gas.

13. The apparatus of claim 11 wherein the first electret is mounted on an inner surface of the container.

14. The apparatus of claim 13 wherein the second electret is mounted on substantially all inner walls of the container.

15. The apparatus of claim 14 wherein the second electret comprises the inner surface of the container and wherein the first electret is mounted on one portion of the inner surface of the container, and further comprising a detector cap being mounted close to and in the electric field of the first electret.

16. The method of monitoring radioactive gases including radon, said method comprising using a container having electrically conductive surfaces such that an enclosed electric field attracts charged ions formed in the container by decay radiations of the radioactive gases within the container to a surface of a positively or negatively charged electret mounted within the container and neutralizing the electret such that the electret surface charge changes in proportion to the number of radioactive decays occuring within the container.

17. The method of claim 16 wherein the electret surface charge diminishes at a rate proportional to radon concentration.

18. The method of claim 16 further comprising removing the electret from the container, sensing the effect of decay on the electret, and returning a fresh electret to the container.

19. The method of claim 16 further comprising placing a cup-like purging container inside the detection container after monitoring radon and thereby purging gas from the detection container.

20. The method of claim 16 further comprising holding the electret on the bottom of the container and removing the bottom of the container with the electret and measuring surface charge changes on the electret.

21. A method of monitoring radioactive gases including radon, said method comprising using a container having electrically conductive surfaces such that an enclosed electric field attracts charged ions formed in the container by decay radiations of the radioactive gases within the container toward a surface of a positively or negatively charged electret mounted within the container, placing a detector cap of the same material as the electret close to and in the electric field of the electret such that the surface charge on the detector cap increases in proportion to the number of radioactive decays occurring within the container.

22. The method of claim 21 further comprising repelling the charged articles toward the detector cap by a second electret mounted within the container in a position spaced from the first electret and from the detector cap, the second electret having a charge similar to a charge on the particles attracted to the detector cap.

23. The method of claim 22 further comprising removing the detector cap from the container, sensing the change in surface change on the detector cap, and returning a fresh detector cap to the container.

24. A method of monitoring a radioactive gas comprising increasing gas volume adjacent a charged electret, passing the radioactive gas including radon through a filter into an opening of a container having electrically conductive surfaces, attracting ions formed by decay radiation of the radioactive gas within the container to the surface of the charged electret mounted within the container, reducing the charge of the electret such that the electret surface charge changes at a rate proportional to the concentration of the radioactive gas, and reducing gas volume adjacent the electret when not in use.

25. The method of claim 24 wherein the electret surface charge diminishes at a rate proportional to radon concentration.

26. A method of monitoring a radioactive gas comprising increasing gas volume adjacent a charged electret, passing the radioactive gas including radon through a filter into an opening of a container having electrically conductive surfaces, attracting ions formed by decay radiation of the radioactive gas within the container toward the surface of the charged electret mounted within the container, placing a detector cap of the same material as the electret close to and in the electric field of the electret such that the surface charge on the detector cap increases in proportion to the number of radioactive decays occurring within the container, and reducing gas volume adjacent the electret when not in use.

27. The method of claim 26 further comprising repelling the charged particles toward the detector cap by a second electret mounted within the container in a position spaced from the first electret and from the detector cap, the second electret having a charge similar to a charge on the particles attracted to the detector cap.

28. The method of claim 27 further comprising removing the detector cap from the container, sensing the change in surface charge on the detector cap, and returning a fresh detector cap to the container.

29. The method of claim 24 further comprising removing the electret, sensing the effect of decay on the electret, and returning a fresh electret into the container.

30. The method of claim 24 further comprising placing a cup-like purging container inside the detection container after monitoring radon and thereby purging gas from the detection container.

31. A radioactive gas monitoring apparatus comprising a container formed of plastic having a surface which is electrically conductive and having a cover, openings in the container for allowing gases to enter the container, a filter to exclude particles and radon progeny, a first electret positioned within the container for holding an electrostatic charge which collects the charged substances formed in the container by radiation from the decaying radioactive products, a removable means connnected to the container for mounting the electret, and means for reducing the volume of gas exposed to the electret when the chamber is not in use.

32. The apparatus in claim 31 wherein the electret is negatively charged so that it collects positively charged ions and radon daughter products formed in the container.

33. The apparatus in claim 31 wherein the electret is positively charged so that it collects negative ions formed in the container.

34. The apparatus of claim 31 further comprising a second electret positioned within the container spaced from the first electret, the second electret having an electrostatic charge which is opposite to an electrostatic charge of the first electret for repelling charged substances in the gas by the second electret toward the first electret.

35. The apparatus of claim 34 wherein the first electret is charged negatively and wherein the second electret is charged positively for driving negatively charged substances in the gas toward the second electret.

36. The apparatus of claim 35 wherein the negatively charged electret comprises means for collecting positively charged substances in the gas and the positively charged electret comprises means for collecting negatively charged substances in the gas.

37. A radioactive gas monitoring apparatus comprising a container formed of an electrically conductive material and having a cover, openings in the container for allowing gases to enter the container, a filter for excluding particles and radon progeny, an electret positioned within the container and comprises means for holding an electrostatic charge which collects the charged substances formed in the container by radiation from the decaying radioactive products, a removable means connected to the container for mounting the electret, and means for reducing the volume of gas exposed to the electret when the chamber is not in use.

* * * * *